United States Patent
Koegler (12)

(10) Patent No.: US 6,478,970 B1
(45) Date of Patent: Nov. 12, 2002

(54) TREATMENT PROCESS FOR REMOVING RADIOACTIVE THORIUM FROM SOLVENT EXTRACTION LIQUID EFFLUENT

(75) Inventor: Sydney Koegler, Richland, WA (US)

(73) Assignee: Framatome ANP Inc., Lynchburg, VA (US)

( * ) Notice: Subject to any disclaimer, the term of this patent is extended or adjusted under 35 U.S.C. 154(b) by 0 days.

(21) Appl. No.: 09/398,978

(22) Filed: Sep. 17, 1999

(51) Int. Cl.[7] .................................................. C02F 1/42
(52) U.S. Cl. ...................... 210/669; 210/682; 210/694
(58) Field of Search ................................. 210/669, 682, 210/684, 694

(56) References Cited

U.S. PATENT DOCUMENTS

| | | | | |
|---|---|---|---|---|
| 4,320,093 A | * | 3/1982 | Volesky et al. | ............. 210/682 |
| 4,501,691 A | * | 2/1985 | Tanaka et al. | ............... 210/682 |
| 4,765,909 A | * | 8/1988 | Rourke et al. | ............... 210/682 |
| 5,854,968 A | * | 12/1998 | Horwitz et al. | ............. 210/682 |

* cited by examiner

*Primary Examiner*—Ivars Cintins
(74) *Attorney, Agent, or Firm*—Kenyon & Kenyon

(57) ABSTRACT

The liquid effluent from solvent extraction contains radioactive thorium Th-231 and Th-234. This invention uses an ion exchange process to remove and concentrate the thorium. The process is designed so that the thorium remains on the ion exchange column until it decays to uranium and protactinium. These decay products are subsequently replaced by additional thorium. Therefore, the thorium never reaches break-through and the column can be used continuously without regeneration.

19 Claims, No Drawings

TREATMENT PROCESS FOR REMOVING RADIOACTIVE THORIUM FROM SOLVENT EXTRACTION LIQUID EFFLUENT

FIELD OF THE INVENTION

The present invention relates to the removal of radioactive thorium from an aqueous solution. The invention particularly relates to a process to reduce the amount of radioactive thorium discharged with the effluent from a solvent extraction uranium purification process.

BACKGROUND

A small amount of radioactive thorium (Th-231 and Th-234) is produced from the radiolytic decay of uranium. The thorium is normally in equilibrium with the uranium and it stays with the uranium throughout normal uranium processing operations. Because of its low concentration and the shielding provided by the uranium, the radioactivity from the thorium associated with the uranium is normally not a problem. However, when uranium is purified by solvent extraction the uranium is extracted into the organic phase and the thorium remains in the aqueous effluent (raffinate) solution. Although the amount of thorium associated with the uranium is very small, it has a high specific activity and therefore significantly increases the radioactivity of the liquid effluent.

Thorium is normally removed from the solvent extraction liquid effluent by chemical separation followed by aging of the separated thorium-containing solids. Alternately, the entire liquid effluent can be held until the thorium decays to an acceptable level for residual radiation. Because Th-234 has a half-life of 24 days, very large tanks or surface impoundments are normally needed to hold the entire liquid effluent stream for the required decay time. Since Th-231 has a half-life of only 25 hours, it is not usually a factor in determining the required decay time of the thorium-containing solids or liquid effluent.

Elimination of the need to store and age the thorium-containing solids or liquids would greatly simplify the design of thorium treatment systems and eliminate the need for potentially dangerous handling and treatment of the thorium.

SUMMARY OF THE INVENTION

It is therefore an object of the present invention to provide a much simpler thorium removal process that is cheaper to build and operate than traditional chemical thorium removal processes. It is a further object of the present invention to provide a process for removing thorium from aqueous solutions which does not require an additional aging step for the separated thorium to allow its decay to a safe level of radioactivity. It is yet another object of the instant invention to provide a process for removing thorium from aqueous solutions which does not require large tanks or surface impoundments to age the liquid effluent solution. Other objects and features of the present invention will become apparent when considered in combination with the following summary and detailed descriptions of certain preferred embodiments of the invention.

The foregoing and related objects of the invention are achieved by the following continuous process for removing radioactive thorium from an aqueous solution:

providing a quantity of ion exchange resin which is selective for binding thorium, and passing the aqueous solution through the quantity of ion exchange resin at a substantially constant flow rate, wherein, the quantity of the ion exchange resin and the substantially constant flow rate combine to provide an average residence time for a thorium ion in the quantity of ion exchange resin which is greater than the average time required for the radioactive decay of the thorium ion.

As the aqueous solution enters the ion exchange resin, the thorium ions in the aqueous solution are selectively bound by the ion exchange resin. As is well known in the art of ion exchange resins, an equilibrium is formed between thorium bound to the ion exchange resin and thorium in the aqueous solution flowing through the ion exchange resin. Therefore, the thorium from the aqueous solution passes through the ion exchange resin at a slower rate than the flow rate of the aqueous solution, because the thorium spends only a fraction of its time free in the aqueous solution and the remainder of its time bound to the ion exchange resin. In the instant invention, since the average residence time of the thorium in the ion exchange resin is equal to or longer than the average time required for the radioactive decay of the thorium, each ion of thorium that is held by the ion exchange resin which decays and is washed off of the resin by the constant flow of aqueous solution is replaced by a fresh ion of thorium. The aqueous solution which emerges from the ion exchange resin contains the products of the radioactive decay of thorium, uranium and protactinium, but is substantially free of thorium.

In a preferred embodiment of the present invention, the aqueous solution undergoes a pretreatment process to enhance its ability to release thorium to the ion exchange resin.

Although removal of thorium and uranium from a solution by ion exchange is known in the field, an ion exchange process wherein the thorium is both removed from the effluent and allowed to decay on the same ion exchange column under continuous operation is new. This makes a much simpler and more efficient process than traditional ion exchange which must be accompanied by elution of the thorium from the column and subsequent treatment and handling of thorium removed from the column or disposal of thorium-loaded ion exchange resin.

DESCRIPTION OF THE INVENTION

The present invention consists of an ion exchange process in which a continuous flow of an aqueous solution contaminated with thorium is passed through an ion exchange resin which selectively retards the thorium for a sufficient period of time to allow the thorium to undergo, radioactive decay, thereby removing the thorium from the aqueous solution. The ion exchange system runs continuously without requiring regeneration of the ion exchange resin or separate storage of the radioactive thorium solids while they decay.

The ion exchange resin type, amount of ion exchange resin and flow rate of the aqueous solution through the ion exchange resin are selected so that the thorium residence time on the ion exchange column is longer that its radiolytic decay time. This insures that the thorium never reaches break-through and the column therefore does not require regeneration.

The particular ion exchange resin to be used is selected according to its thorium ion exchange capacity, its selectivity of thorium over other metal ions present in the aqueous solution to be used treated and the chemical compatibility of the ion exchange resin with the aqueous solution. For instance, in the preferred embodiment in which raffinate is the aqueous solution to be treated, the ion exchange resin should be selective for thorium over iron, gadolinium, protactinium and uranium, which are also present in raffinate, and the ion exchange resin must be compatible with the nitric acid which is also present in raffinate. For use with raffinate, particularly preferred ion exchange resins include, but are not limited to, Purolite S-950 resin (manufactured by Purolite company, Bala Cynwyd, Pa.), Amberlyst A-15 resin (manufactured by Rohm and Haas Company, West Philadelphia, Pa.) and the inorganic ion exchanger antimony pentoxide.

One of skill in the art of ion exchange resins would well be able to choose an effective ion exchange resin or inorganic ion exchanger for any particular thorium-containing aqueous solution based on a known chemical analysis of that solution.

The ion exchange resin is preferably housed in a column, with the aqueous solution applied at the top of the column flowing out the bottom of the column, but any other configuration may be used which allows the aqueous solution a flow path through substantially the entire quantity of ion exchange resin.

The amount of ion exchange resin used and the flow rate of the aqueous solution through the ion exchange resin are determined based on the amount of residual thorium that is desired in the aqueous solution which exits the ion exchange resin. Although the amount of ion exchange resin and flow rate of the aqueous solution can be calculated from the known affinity of the ion exchange resin for the thorium and a known concentration of thorium in the untreated aqueous solution, they can also be experimentally determined in the following manner:

A sample of the thorium-containing aqueous solution is passed through a column containing a sample of the ion exchange resin at a known flow rate until the system reaches equilibrium as measured by the radiation profile of the top, middle and bottom of the column and the measured amount of thorium emerging from the bottom of the column. If the measured amount of thorium emerging from the bottom of the column at equilibrium is greater than desired, then the amount of resin can be adjusted upwards and/or the flow rate of the aqueous solution through the resin can be adjusted downwards. If the measured amount of thorium emerging from the bottom of the column at equilibrium is less than desired, then the amount of resin can be adjusted downwards and/or the flow rate of the aqueous solution through the resin can be adjusted upwards. Once the desired conditions have been reached, scale-up of the process can be calculated based on a linear extrapolation of hydraulic residence time, i.e. ion exchange resin volume divided by aqueous solution flow rate.

The process of the present invention removes between about 75% and about 95% of the original thorium from the aqueous solution, and the finished aqueous solution can be safely discarded. The finished aqueous solution is optionally neutralized before discarding.

In a preferred embodiment of the invention, the aqueous solution is treated before contacting the ion exchange resin to make the aqueous solution more amenable to thorium removal. Pretreatment steps for the aqueous solution include one or more of the following:

dilution with deionized water to improve the loading efficiency of the thorium with respect to competing cations and to lower the concentration of thorium complexing ions such as phosphate, addition of complexing agents to compete with thorium for the available counter-ions in the aqueous solution, thereby reducing the fraction of thorium sequestered in complexes with the counter-ions and improving thorium loading efficiency, adjusting the acid or base concentration to prevent chemical degradation of the ion exchange resin, and removal of trace organics to prevent degradation and plugging of the ion exchange resin.

The treatment of the effluent prior to its processing by the ion exchange system assures that the thorium can be loaded onto the ion exchange resin, minimizes the size of the ion exchange system required, and makes certain that the ion exchange system can be operated continuously for an extended time without ion exchange resin degradation or fouling. Generally, chemical analysis of the aqueous solution is available or can be performed to enable one of skill in the art to determine the proper pretreatment of the raffinate to ensure that the concentration of the thorium is not so high as to overwhelm the capacity of the ion exchange resin, any complexing agents which can form complexes with thorium are substantially prevented from doing so, and that the raffinate will not chemically damage or plug the ion exchange resin.

In the particular embodiment in which the aqueous solution is a raffinate from a solvent extraction uranium purification process, the raffinate is preferably diluted with water both to improve the thorium loading and to reduce the nitric acid concentration of the raffinate. Raffinate is typically about two and a half to about three molar nitric acid. Dilution with water in a 2:1 water to raffinate ratio lowers the nitric acid concentration to one molar or less nitric acid and avoids having to add a base for partial neutralization of the acid before ion exchange. The 2:1 water dilution generally provides sufficient dilution to achieve reasonable thorium removal from the diluted raffinate by the ion exchange resin. However, higher water dilution ratios are used with certain raffinates, such as those containing high amounts of phosphates which can complex with the thorium, hampering effective ion exchange. Dilution with water is the first step of pretreatment of the raffinate and is accompanied by mixing.

Complexing agents, such as aluminum, may be added to the raffinate, but this is generally only necessary when the raffinate has a high content of fluoride. Fluoride analysis can be performed on the diluted raffinate to determine the fluoride concentration. One of skill in the art of ion exchange is then capable of determining if the concentration of fluoride ions is high enough to interfere with the ion exchange process. Additionally, this can be determined experimentally by the addition of a complexing agent to a test sample of diluted raffinate, followed by ion exchange and comparison to ion exchange of a sample of diluted raffinate without the complexing agent.

If the raffinate contains a sufficient concentration of acid or base after dilution to damage the ion exchange resin or prevent effective thorium loading of the ion exchange resin, the pH of the raffinate is adjusted using acid or base to prevent damage to the ion exchange resin and allow effective thorium loading. One of skill in the art of ion exchange is capable of determining whether the acidity/basicity of the raffinate will harm the ion exchange resin or the ion exchange process and is further capable of adjusting the pH to correct the situation.

Trace organic compounds may be removed from the raffinate prior to ion exchange to prevent degradation and clogging of the ion exchange resin. The removal may be performed by any known means. Filtration of the raffinate or diluted raffinate is preferred, followed by treatment with activated charcoal.

DETAILED DESCRIPTION OF PREFERRED EMBODIMENTS

The following are examples of results obtained during laboratory-scale process development tests in which the effects of pretreatment of the raffinate were being investigated. The ion exchange column used was a 1.0 inch inner diameter glass column containing 400 mL of Amberlyst-15 ion exchange resin (resin bed height was 31 inches). The feed flow rate through the ion exchange column was 200 mL/hr.

The ion exchange column had been operated continuously for 6 months, and was currently being operated with feed prepared from raffinate containing 2.4, 0.14 and 0.33 g/L gadolinium, iron and aluminum, respectively, and 2.5 molar nitric acid. With the current feed to the column containing 1 part raffinate and 3 parts water, 0.2 g/L aluminum was being added as additional complexant for the fluoride in the raffinate. Under these conditions, 96–97% of the thorium was being removed. When addition of aluminum to this feed was terminated, the percentage of thorium-removal began steadily decreasing. At the point where it had decreased to 82 percent, the addition of aluminum was once again initiated. The percentage thorium removed by the ion exchange bed increased back to the 95 to 98% level, where it remained for 5 days operation. At the end of the 5 days, the feed dilution was decreased to 1 part raffinate and 2 parts water, with the addition of aluminum as before. Under these process conditions with less dilution of the raffinate, the thorium removal dropped to 91 to 92% for the two remaining days of operation with this raffinate.

Another example of the effect of adding aluminum to the feed if it contains fluoride occurred with a feed solution which was 1 part raffinate and 2 parts water. The raffinate contained 3.9, 0.24 and 0.23 g/L gadolinium, iron and aluminum, respectively. The nitric acid concentration in the raffinate was 2.4 molar, and the raffinate contained fluoride as a result of fluoride contamination in the uranium powder being processed through the solvent extraction facility. With an additional 0.2 g/L aluminum added to the feed, the ion exchange bed was removing 91–96% of the thorium during the first four day period. When the addition of aluminum to the feed was terminated the thorium removal quickly decreased to 68%, at which point the addition of aluminum was reinstated. The thorium removal quickly increased to 90% and remained in the 88–90% range for 3 days, at which time use of that raffinate was terminated.

In both of the above examples, there was a decrease in the amount of thorium loaded on the resin in the upper part of the ion exchange resin bed (as measured by the radioactivity in that region of the column) concurrent with the observation of a decrease in the percentage thorium removal from the feed solution following termination of aluminum addition to the feed. When the addition of aluminum was restarted, the amount of thorium loaded in the upper part of the ion exchange resin bed increased back to the prior value. Thus, the addition of aluminum to a feed solution containing fluoride has at least two beneficial effects: (1) a higher percentage removal of thorium from the feed solution, and (2) a larger thorium-loading capacity on the resin bed.

The present invention has been described in connection with some of its preferred embodiments. These preferred embodiments are not intended to limit the invention, but to illustrate the principals of the invention. It should be understood that various modifications and changes may be readily apparent to those of skill in the art, and that these modifications and changes are considered as falling within the scope of the invention, as defined by the claims given below.

I claim:

1. A continuous process for removing radioactive thorium from an aqueous solution comprising:

providing a quantity of ion exchange resin which is selective for binding thorium, and passing the aqueous solution through the quantity of ion exchange resin at a substantially constant flow rate, wherein, the quantity of the ion exchange resin and the substantially constant flow rate are such that the ion exchange resin selectively retards the thorium for a period of time longer than a period of time sufficient for radioactive decay of the thorium.

2. The continuous process of claim 1, wherein the ion exchange resin is selective for binding thorium over a metal ion other than thorium, wherein said metal ion is contained in the aqueous solution.

3. The continuous process of claim 2, wherein said metal ion is uranium.

4. The continuous process of claim 2, wherein said metal ion is protactinium.

5. The continuous process of claim 1, further comprising the addition of complexing agents to the aqueous solution prior to passing the aqueous solution through the quantity of ion exchange resin.

6. The continuous process of claim 1, further comprising the dilution of the aqueous solution with water prior to passing the aqueous solution through the quantity of ion exchange resin.

7. The continuous process of claim 1, further comprising removing organic material from the aqueous solution prior to passing the aqueous solution through the quantity of ion exchange resin.

8. The continuous process of claim 1, further comprising adjusting the acid or base concentration of the aqueous solution prior to passing the aqueous solution through the quantity of ion exchange resin in order to prevent degradation of the quantity of ion exchange resin.

9. The continuous process of claim 1, wherein the aqueous solution is an effluent from a solvent extraction uranium purification process.

10. The continuous process of claim 9, further comprising a step of diluting the effluent from the solvent extraction uranium purification process with water prior to the passing of the diluted effluent through the quantity of ion exchange resin.

11. The continuous process of claim 10, wherein the amount of water used in the step of diluting is a sufficient amount to reduce a concentration of nitric acid in the diluted effluent to 1.0 molar or less.

12. The continuous process of claim 10, further comprising removing organic material from the effluent or diluted effluent prior to passing the diluted effluent through the quantity of ion exchange resin.

13. The continuous process of claim 12, wherein the organic material is removed by filtering.

14. The continuous process of claim 13, further comprising: passing the effluent or diluted effluent through activated charcoal.

15. The continuous process of claim 12, wherein the organic material is removed by passing the effluent or diluted effluent through activated charcoal.

16. The continuous process of claim 12, further comprising: adding complexing agents to the effluent or diluted effluent prior to passing the diluted effluent through the quantity of ion exchange resin.

17. The continuous process of claim 16, wherein the complexing agent binds fluoride.

18. The continuous process of claim 17, wherein the complexing agent is aluminum.

19. A continuous process for removing radioactive thorium from an aqueous solution comprising:

provinding a quantity of ion exchange resin which is selective for binding thorium and has a finite thorium binding capacity, and passing the aqueous solution through the quantity of ion exchange resin at a substantially constant flow rate and in an amount which contains more thorium than the thorium binding capacity of the ion exchange resin, wherein, the quantity of the ion exchange resin and the substantially constant flow rate are such that the ion exchange resin selectively retards the thorium for a period of time longer than a period of time sufficient for radioactive decay of the thorium.

\* \* \* \* \*